United States Patent [19]

Brewer et al.

[11] Patent Number: 4,807,831
[45] Date of Patent: Feb. 28, 1989

[54] COMBINATION BOUNDARY LAYER CONTROL SYSTEM FOR HIGH ALTITUDE AIRCRAFT

[75] Inventors: George D. Brewer, San Marcos, Calif.; David P. Marshall, Powder Springs, Ga.

[73] Assignee: The United States of America as represented by the Secretary of the Air Force, Washington, D.C.

[21] Appl. No.: 84,341

[22] Filed: Aug. 12, 1987

[51] Int. Cl.$^4$ .................... B64C 1/38; B64C 21/06
[52] U.S. Cl. ................... 244/117 A; 244/209; 60/267
[58] Field of Search ............ 244/74, 209, 117 A, 244/204; 60/730, 266, 267, 259; 62/DIG. 5

[56] References Cited

U.S. PATENT DOCUMENTS

| | | | |
|---|---|---|---|
| 2,867,391 | 1/1959 | Jacobsen | 244/209 |
| 2,958,482 | 11/1960 | Summers, Jr. | 244/74 |
| 3,093,350 | 6/1963 | Wilkins | 244/42 |
| 3,126,718 | 3/1964 | Flamand | 244/117 A |
| 3,129,754 | 4/1964 | Menzel | 244/117 A |
| 3,253,423 | 5/1966 | Sonnabend | 62/239 |
| 3,556,443 | 1/1971 | Kidwell | 244/130 |
| 4,273,304 | 6/1981 | Frosch et al. | 244/117 A |
| 4,505,124 | 3/1985 | Mayer | 62/180 |

FOREIGN PATENT DOCUMENTS 1291927  3/1962  France .................... 244/117 A

Primary Examiner—Galen L. Barefoot
Attorney, Agent, or Firm—Jules J. Morris; Donald J. Singer

[57] ABSTRACT

The invention comprises a combination boundary layer control system that utilizes both suction and cryogenic wall cooling to reduce aircraft drag. The invention is particulary useful in circumstances where liquid hydrogen or other cryogenic fuels are used to operate the aircraft.

In the preferred embodiment of the invention, a network of D-tube ducts are provided that are fluidly connected to a cryogenic fluid source. These cryogenic fluid ducts are selectively fed cryogenic fluid to reduce aircraft surrface temperature and promote adhesion of boundary layer air to the aircraft. An air duct system is also provided to apply suction to the aircraft surface in order to remove the boundary layer at low altitude. The suction is applied by means of a multitude of minute holes in the aircraft skin which are fluidly connected to the air duct system.

20 Claims, 1 Drawing Sheet

COMBINATION BOUNDARY LAYER CONTROL SYSTEM FOR HIGH ALTITUDE AIRCRAFT

STATEMENT OF GOVERNMENT INTEREST

The invention described herein may be manufactured and used by or for the Government for governmental purposes without the payment of any royalty thereon.

TECHNICAL FIELD

This invention relates to high altitude aircraft and specifically to using boundary layer control to reduce drag caused by air flow over external aircraft surfaces.

BACKGROUND OF THE INVENTION

Aerodynamic drag along the external surfaces of an aircraft decreases aircraft efficiency and requires the use of increased fuel in flight. It is a long standing premise of aircraft design that reduced drag increases aircraft efficiency and range. A significant part of aircraft drag originates with the generation of a boundary layer across aircraft external surfaces. Generally, the boundary layer is a layer of fluid, in this case air, that moves at a retarded speed immediately adjacent to the aircraft skin (surface). This is because frictional forces retard the motion of the fluid in a thin layer near the surface. As the aircraft passes through the air stream, this thin boundary layer, in which friction must be taken into account, increases in thickness considerably in the downstream direction, such that flow in the boundary layer may become reversed. At this point the boundary layer separates from the surface. This is what is called boundary layer separation. This phenomenon is always associated with the formation of vortices and very large energy losses in the wake of the aircraft body. The large drag of such aircraft bodies can be explained by the existence of the large deviation in pressure distribution which is a consequence of boundary layer separation.

It has therefore been a tenet of aircraft design to minimize boundary layer generation across aircraft wings and fuselages. While these boundary layers are impossible to completely eliminate, various means have been used to minimize their effect on aircraft performance. One method has been to physically remove the boundary layer through the use of suction ports on the wings or airframe that divert this thin layer sufficiently to prevent boundary layer separation. The use of suction to remove boundary layer can be done by at least two methods. The suction can be developed by connecting suction ports to outflow ports on the suction side (low pressure) of aircraft wings or suction pumps can be used to develop a low pressure relative vacuum source for the removal of the boundary layer. Unfortunately, it is not always possible to develop sufficient suction from the suction side of the wing without adversely affecting aircraft design. Further, use of suction pumps for boundary layer control requires an energy expenditure that adversely affects aircraft efficiency. This is particularly true with long-endurance aircraft, which are intended to operate efficiently for relatively long periods of time. Any boundary layer control system for long endurance aircraft with significant energy expenditures would have an adverse effect on fuel requirements.

A need exists, therefore, for a boundary layer control system which is effective in reducing aircraft drag and yet has minimal energy requirements.

SUMMARY OF THE INVENTION

The invention comprises a combination boundary layer control system that utilizes both suction and cryogenic wall cooling to reduce aircraft drag. The invention is particularly useful in circumstances where liquid hydrogen or other cryogenic fuels are used to operate the aircraft.

In the preferred embodiment of the invention, a first low altitude boundary layer control uses suction to reduce boundary layer thickness and prevent boundary layer separation during aircraft climbs to high altitudes. The combination boundary layer control system uses cryogenic cooling at high altitudes to reduce boundary layer generation and thereby minimize separation of boundary layer and turbulent air from the aircraft skin.

In the preferred embodiment of the invention, a network of D-tube ducts are provided that are fluidly connected to a cryogenic fluid source. These cryogenic fluid ducts are selectively fed cryogenic fluid to reduce aircraft surface temperature and promote adhesion of boundary layer air to the aircraft. The aircraft surface is cooled primarily at high altitude where icing is not a problem. An air duct system is also provided to apply suction to the aircraft surface in order to prevent boundary layer separation at low altitude. The suction is applied by means of a multitude of minute holes in the aircraft skin which are fluidly connected to the air duct system.

In the preferred embodiment of the invention, the air duct system is connected to a vacuum or suction pump which reduces air pressure in the air duct system so that it will draw boundary layer air from the aircraft surfaces. Preferably the air duct system comprises grooves in the cryogenic ducts which are fluidly connected to suction ducts in order to draw air from the multitude of minute holes in the aircraft skin.

Also in the preferred embodiment of the invention, the cryogenic fluid source comprises an aircraft fuel tank containing a cryogenic liquid such as liquid hydrogen. The network of D-tubes are thermally connected to the aircraft skin, so that flow of cryogenic fluid through the D-tubes will rapidly reduce aircraft skin temperature.

In an alternate embodiment of the invention, the low-pressure air source may comprise a port on the suction side of an aircraft airfoil.

BRIEF DESCRIPTION OF THE DRAWINGS

The foregoing and other objects and advantages of the invention will be apparent from the following more particular description of the preferred embodiment of the invention, as illustrated in the accompanying drawings, in which like reference characters refer to the same parts throughout the different views. The drawings are not necessarily to scale, emphasis instead being placed upon illustrating the principles of the invention.

DETAILED DESCRIPTION OF THE INVENTION

Figure 1:
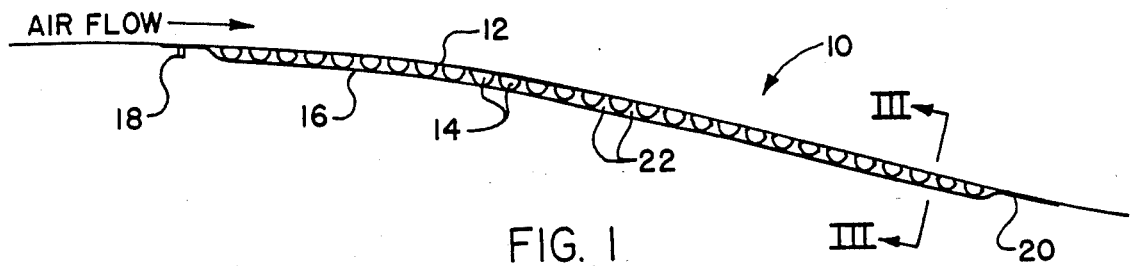
FIG. 1 is a cross-sectional view of a segment of a high altitude aircraft airfoil structure which incorporates the principles of this invention.

FIG. 1 shows a segment of an aircraft skin surface, incorporating a combination boundary layer control system which incorporates the principles of this invention. Boundary layer control is used to improve aircraft flight characteristics and in some modern aircraft is required throughout various portions of the aircraft flight envelope. The view of FIG. 1 is that of a typical aircraft airfoil structure 10 wherein it is desired to control the flow of air over the external aircraft surface or skin 12. The objective can be to control the boundary layer in order to maintain a laminar flow or alternatively to prevent detachment of a turbulent flow. In either case, the desired result is the reduction of drag upon the aircraft. The figures show a thin, lightweight design which is capable of conducting a cryogenic fluid into intimate thermal contact with the aircraft skin to effect cooling, and also to independently provide passages through which suction may be applied to multiple small holes in the aircraft skin in order to remove the boundary layer. With this design, suction and cooling may be applied either independently or simultaneously.

In the view of FIG. 1, cryogenic cooling ducts 14, in the form of D-tubes, are placed immediately below the aircraft skin 12. The aircraft skin 12 may comprise either aluminum or other metallic or composite aircraft skin material (such as graphite/epoxy, with an aluminum faceplate). The cryogenic cooling ducts are positioned adjacent to the aircraft skin 12 by an inner sheet 16, which is fastened to the outer skin by fasteners 18 and a contraction joint 20. In between the cryogenic cooling ducts 14 are suction air ducts 22. In the preferred embodiment of this invention, surface 12 comprises an aluminum faceplate and the D-tubes of the cryogenic cooling ducts are brazed to the underside of the faceplate.

Figure 2:
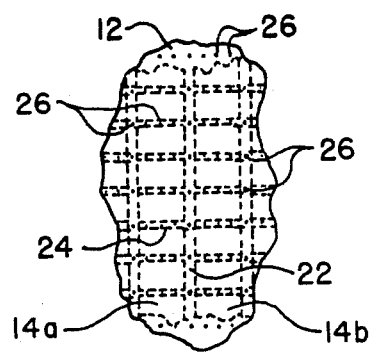
FIG. 2 is a partial top view of the airfoil of FIG. 1 with hidden detail displayed in dotted lines.
Figure 3:
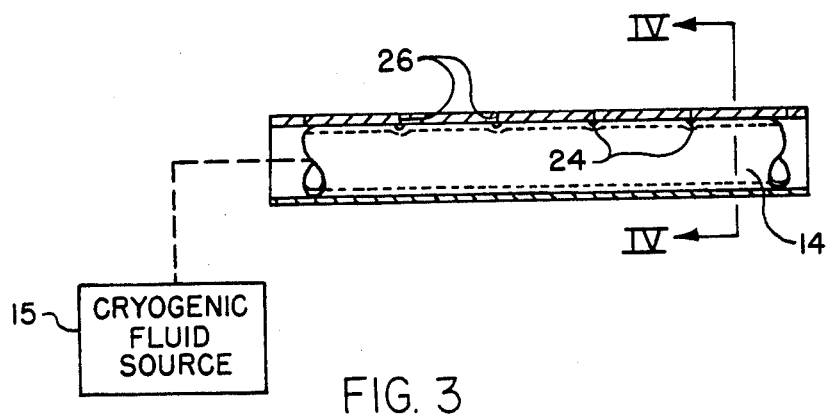
FIG. 3 is a cross-sectional view of FIG. 1, taken along lines III—III, which also schematically shows a cryogenic fluid source.
Figure 4:
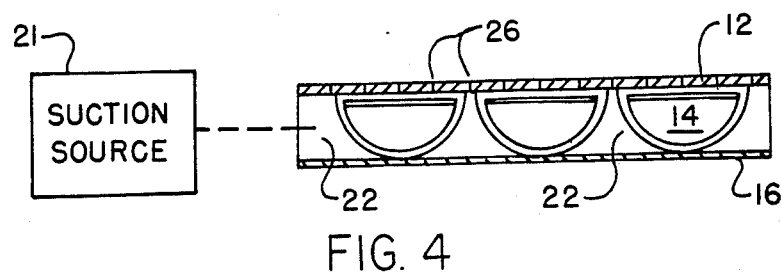
FIG. 4 is a cross-sectional view of FIG. 3, taken along lines IV—IV, which also schematically shows a suction source.

The details of the preferred embodiment can be understood more readily with reference to the expanded cross-sectional views of FIGS. 2, 3 and 4. FIG. 2 is a top view of the aircraft surface 10 of FIG. 1 in which hidden details are shown in dotted lines. Specifically, two D-tubes, cryogenic cooling ducts 14a and 14b appear in the drawing as almost a ladder-like structure. This is because the air cooling ducts comprise grooves 24 on the flat surface of the D-tubes. In FIG. 3, cooling duct 14 can be seen to have several chordwise grooves 24 along its upper surface. Lengthwise grooves may also be desired, depending on the amount of surface suction required. These grooves allow airflow from the surface of the aircraft structure into the ducts 22 of the suction system.

The ducts 22 and grooves 24 facilitate the placement and fluid interconnection of very small holes in the aircraft skin so that boundary layer growth may be controlled by suction. Typically, these holes are quite small, in the order of 0.004 inch diameter. These very small holes 26 are shown in the views of FIGS. 2 and 3.

FIG. 4 is an enlarged view of the cross-section of FIG. 1 and may also be considered a secondary cross-section of FIG. 3 along lines IV—IV. In this view, it can be seen that the D-tubes comprising cryogenic cooling ducts are firmly sandwiched between upper skin 12 and lower sheet 16. For a strong and stable structure, the D-tubes would preferably be brazed to the inner side of the skin 12 and to sheet 16. If aluminum, the aircraft skin can be quite thin, about 0.04 inches.

Typically, this invention would be most useful for a high altitude aircraft. New high technology, high altitude aircraft are being considered with various cryogenic fuels. One such fuel is liquid hydrogen. Liquid hydrogen or other cryogenic fuels can be considered a cryogenic fluid source 15 (FIG. 3) that can be directed from a fuel tank to the cryogenic cooling ducts 14. It is therefore possible to use the aircraft fuel rather than any additional liquid to supply the cryogenic portion of the combination boundary layer control system. Use of the aircraft fuel for the cryogenic cooling greatly reduces the additional weight required for cryogenic cooling as compared to a cooling system requiring a separate cryogenic fluid source.

A low pressure source of suction 21 (FIG. 4) for the boundary layer control system can be provided by two methods. In some aircraft it is possible to directly connect the suction air ducting with a reduced pressure (suction) surface on the underside of an airfoil. Airfoils typically have low pressure areas and high pressure areas in order to create lift. Such low pressure airfoil areas can sometimes be used to supply the suction needed to strip the boundary layer off other aircraft surfaces. Where use of such low pressure area is not feasible, a suction pump would be required. In a high altitude aircraft, as is foreseen for this invention, it is likely that a low pressure suction pump or vacuum pump would be used to provide sufficient suction to strip boundary layer flows off aircraft surfaces.

Boundary layer control by suction is most useful at low altitudes where possible ice formation on aircraft surfaces would prevent use of cryogenic boundary layer control. The high degree of moisture in the atmosphere at low altitudes results in the formation of ice on cryogenically cooled surfaces. Once the aircraft has risen to an appropriate altitude (25,000–35,000 ft., typically), the cryogenic cooling of the outer surfaces can be used in addition to or instead of the suction cooling, since high altitude air is much cooler and dryer. It is possible to operate both systems simultaneously during transitional periods or when otherwise required. In circumstances where liquid hydrogen or another cryogenic fluid is used to fuel the aircraft, cryogenic cooling is a significantly more efficient way to control boundary layer separation than suction. This is because the energy requirements for cryogenic cooling are extremely low as the cryogenic cooling ducts are merely filled with cryogenic fluid. Suction boundary layer control requires the operation of a suction pump having relatively high energy requirement. Therefore, during high altitude cruise it would be preferable to control boundary layer separation by use of the cryogenic cooling alone.

Cooling of aircraft surfaces tends to stabilize the boundary layer and reduce boundary layer separation. In certain ranges of supersonic mach numbers, it is possible to completely stabilize the boundary layer by the application of cooling at the outer surface. Cooling can also be applied in order to reduce the thickness of the boundary layer and thus the likelihood of separation as the air flow passes over warmer structures. Skin temperatures in the range −200° F. are considered normal for stabilizing the boundary layer and preventing flow separation. In contrast, boundary layer control by suction physically prevents boundary layer build-up and separation by removing the boundary layer from the aircraft surface.

The dimensions given in reference to the above figures should be taken as illustrative examples. The ducts for carrying the cryogenic coolant are preferably aluminum D-ducts, ¼ inch in radius. It is only necessary that a good thermally conductive path be provided so that the aircraft skin can be efficiently cooled to a low temperature. The ducts can be of other shapes and sizes and made of other materials consistent with this objective, as long as they also permit free passage of suction air between the cooling ducts. The holes shown for the boundary layer are also a representative diameter. The actual hole size and spacing is determined by hole location on the airfoil surface and the local flow conditions of a particular aircraft surface. As shown in FIGS. 2 and 3, provision is made for locating these holes wherever necessary by the formation of chordwise grooves on the cryogenic cooling ducts.

The combination boundary layer control system disclosed in this invention provides a substantial savings in energy for high altitude, long endurance aircraft where cryogenic cooling can be used for boundary layer control. The suction system is included because cryogenic cooling can not be used at low altitudes due to freezing problems. Both the suction and cooling boundary layer control mechanisms are combined in a common, compact, lightweight and efficient system. Further, both systems can be used simultaneously. This structurally efficient and simple arrangement therefore allows for independent operation of the suction and cryogenic boundary layer control mechanisms.

While the invention has been particularly described with reference to the preferred embodiment thereof, it will be understood by those skilled in the art that various changes in substance and form can be made therein without departing from the spirit and the scope of the invention as detailed in the attached claims.

I claim:

1. A combination boundary layer control system for high altitude aircraft comprising:
    a cryogenic cooling system for directing a cryogenic fluid into intimate contact with an aircraft surface in order to lower the aircraft surface temperature to less than 100° F. and thus promote boundary layer adhesion; and
    an air duct system for applying suction to the aircraft surface in order to prevent boundary layer separation.

2. The combination boundary layer control system of claim 1 wherein the cryogenic cooling system comprises cryogenic coolant ducts which include rows of D-tubes fluidly connected to a source of cryogenic fluid.

3. The combination boundary layer control system of claim 1 wherein the cryogenic fluid comprises liquid hydrogen.

4. The combination boundary layer control system of claim 1 wherein the cryogenic fluid comprises aircraft fuel.

5. The combination boundary layer control system of claim 1 wherein suction is applied to the aircraft skin by means of a multitude of minute holes in the aircraft skin which are fluidly connected to said air duct system.

6. The combination boundary layer control system of claim 2 wherein suction is applied to the aircraft skin by means of a multitude of minute holes in the aircraft skin which are fluidly connected to said air duct system.

7. The combination boundary layer control system of claim 6 wherein said air duct system comprises chordwise grooves in said cryogenic coolant ducts.

8. The combination boundary layer control system of claim 1 further comprising a thermally conductive path between said cryogenic cooling system and the aircraft skin.

9. The combination boundary layer control system of claim 1 further comprising a source of low pressure air connected to said air duct system for applying suction to the aircraft surface.

10. The combination boundary layer control system of claim 9 wherein said source of low pressure air comprises a vacuum pump.

11. The combination boundary layer control system of claim 9 wherein said source of low pressure air comprises a port on a low pressure surface of an aircraft airfoil.

12. A combination boundary layer control system for high altitude aircraft comprising:
    a cryogenic cooling system for directing a cryogenic fluid adjacent to an aircraft surface in order to lower the aircraft surface temperature to a cryogenic temperature and thus promote boundary layer adhesion, wherein the cryogenic cooling system comprises cryogenic coolant ducts fluidly connected to a source of cryogenic fluid; and
    an air duct system for applying suction to the aircraft surface in order to prevent boundary layer separation wherein suction is applied to the aircraft skin by means of a multitude of minute holes in the aircraft skin which are fluidly connected to said air duct system and interspaced with said cryogenic cooling system.

13. The combination boundary layer control system of claim 12 wherein the cryogenic fluid comprises liquid hydrogen.

14. The combination boundary layer control system of claim 12 wherein the cryogenic fluid comprises aircraft fuel.

15. The combination boundary layer control system of claim 12 wherein said air duct system comprises chordwise grooves in said cryogenic coolant ducts.

16. The combination boundary layer control system of claim 12 further comprising a thermally conductive path between said cryogenic cooling system and the aircraft skin.

17. The combination boundary layer control system of claim 12 further comprising a source of low pressure air connected to said air duct system for applying suction to the aircraft surface.

18. The combination boundary layer control system of claim 17 wherein said source of low pressure air comprises a vacuum pump.

19. The combination boundary layer control system of claim 17 wherein said source of low pressure air comprises a port on a suction side of an aircraft airfoil.

20. A combination boundary layer control system for high altitude aircraft comprising:
    a cryogenic cooling system for directing a cryogenic fluid adjacent to an aircraft surface in order to lower the aircraft surface temperature and thus promote boundary layer adhesion, wherein the cryogenic cooling system comprises cryogenic coolant ducts fluidly connected to a source of cryogenic fluid; and
    an air duct system for applying suction to the aircraft surface in order to prevent boundary layer separation wherein suction is applied to the aircraft skin by means of a multitude of minute holes in the aircraft skin which are fluidly connected to said air duct system and wherein said air duct system comprises chordwise grooves in said cryogenic coolant ducts.

* * * * *